March 19, 1957 D. W. KELBEL 2,785,583
TRANSMISSION
Filed April 26, 1949 7 Sheets-Sheet 1

Inventor:
Donald W. Kelbel

March 19, 1957  D. W. KELBEL  2,785,583
TRANSMISSION
Filed April 26, 1949  7 Sheets-Sheet 2
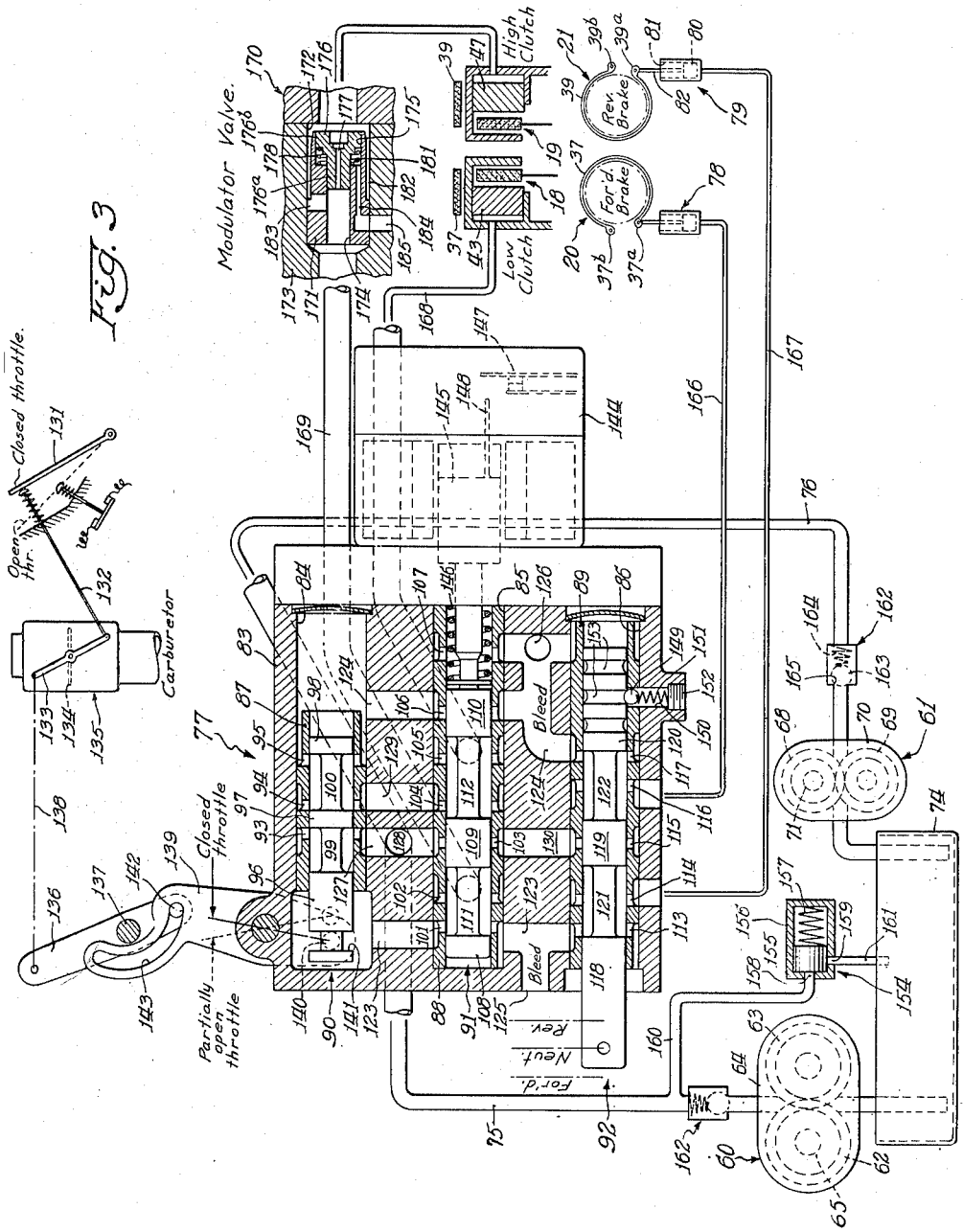

March 19, 1957     D. W. KELBEL     2,785,583

TRANSMISSION

Filed April 26, 1949     7 Sheets-Sheet 3

Inventor:
Donald W. Kelbel

March 19, 1957 — D. W. KELBEL — 2,785,583
TRANSMISSION
Filed April 26, 1949 — 7 Sheets-Sheet 4

Inventor:
Donald W. Kelbel

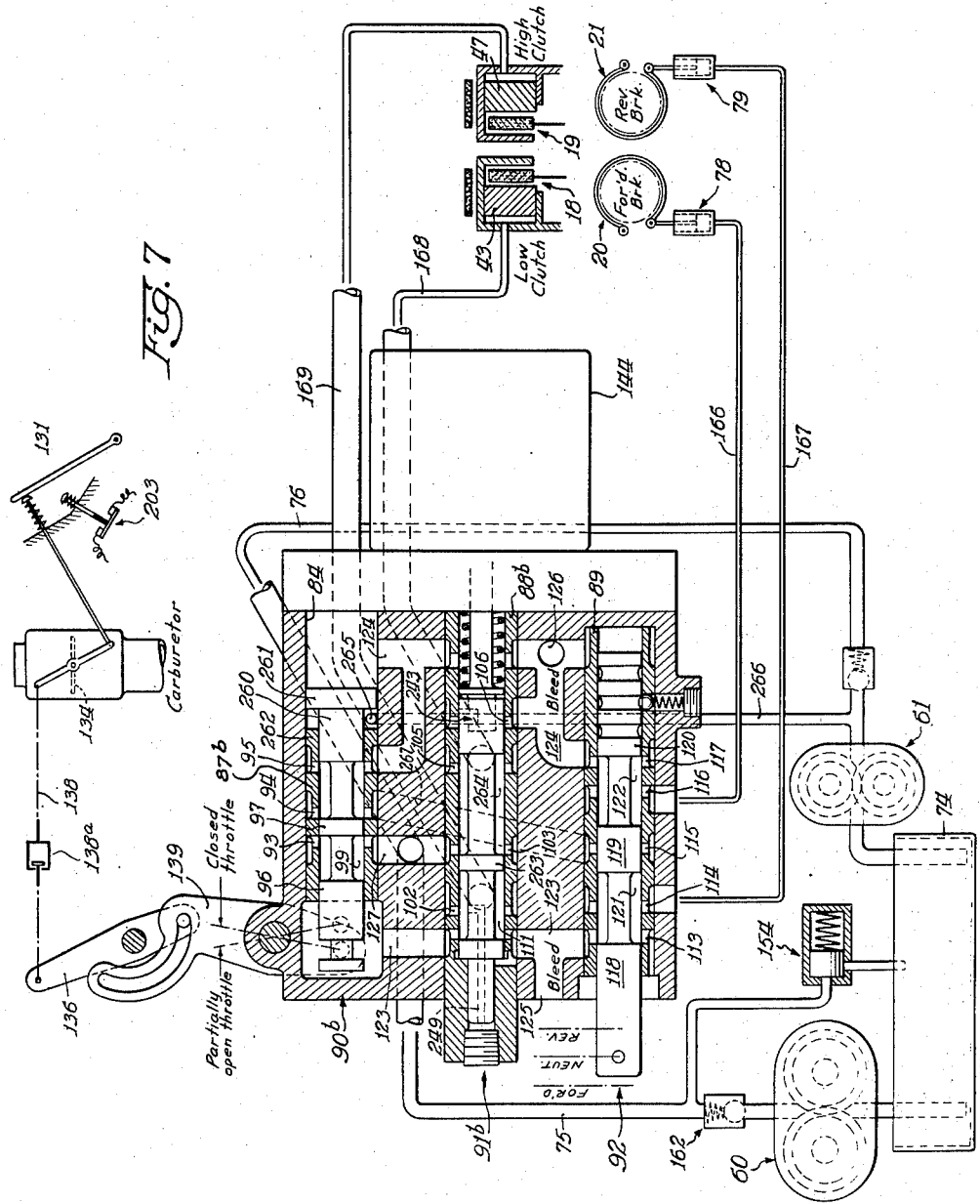

March 19, 1957 D. W. KELBEL 2,785,583
TRANSMISSION
Filed April 26, 1949 7 Sheets-Sheet 6
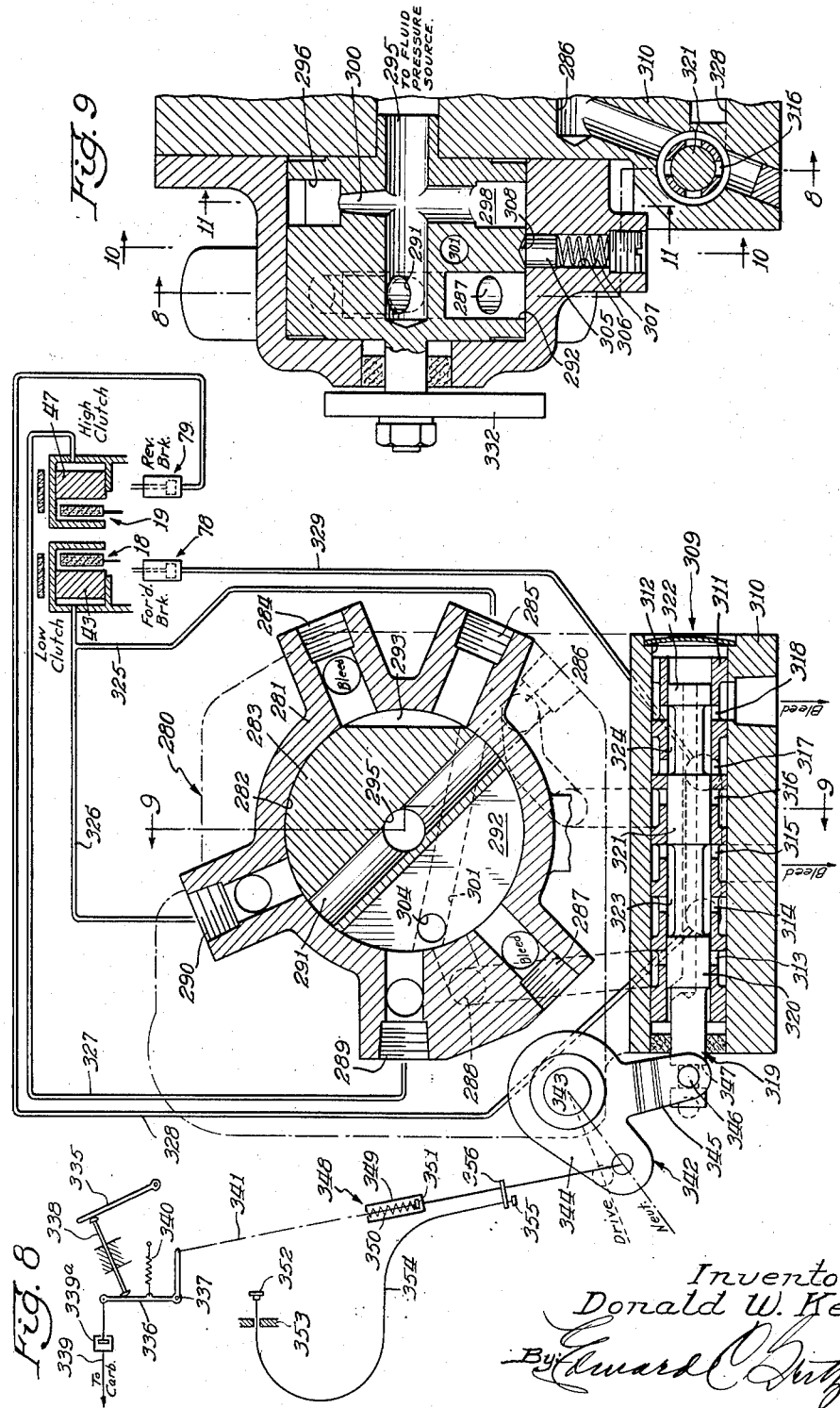
Inventor:
Donald W. Kelbel
By Edward C. Sitzlauge
Atty.

March 19, 1957 D. W. KELBEL 2,785,583
TRANSMISSION
Filed April 26, 1949 7 Sheets-Sheet 7

Inventor:
Donald W. Kelbel

United States Patent Office 2,785,583
Patented Mar. 19, 1957

2,785,583

TRANSMISSION

Donald W. Kelbel, Muncie, Ind., assignor to Borg-Warner Corporation, Chicago, Ill., a corporation of Illinois Application April 26, 1949, Serial No. 89,607

22 Claims. (Cl. 74—472)

My invention relates to transmissions and particularly to transmissions for automotive vehicles.

It is an object of the present invention to provide an improved hydraulic control for transmissions which includes a selector valve for conditioning a transmission for a drive either in forward or reverse, a second valve for shifting at the will of the operator between low and high speed forward drives and a third valve under the control of the vehicle accelerator for providing a gradual engagement of a friction engaging means and thereby a gradual start to the vehicle.

It is another object of the invention to provide an improved hydraulic modulating mechanism for a power train completing friction engaging means which allows at first a relatively high rate of fluid flow to a fluid motor for the friction engaging means and subsequently decreases the flow of fluid to the motor with an increase of fluid pressure on the motor for giving a smooth engagement to the friction engaging means. It is a related object to provide an improved form of the modulating mechanism which functions to provide an engagement of both a high speed ratio engaging means in the manner just mentioned and also a simultaneous disengagement of a friction engaging means for a relatively low speed drive gradually and in accordance with the increase in fluid pressure on the high speed friction engaging means.

It is another object of the invention to provide hydraulic means governed by the speed of the driven shaft of the transmission for holding engaged a certain friction engaging means which completes a power train through the transmission until the vehicle stops for preventing so called free wheeling of the vehicle.

It is a further object of the invention to provide improved hydraulic controlling mechanism for a transmission that includes a rotary selector valve which is shifted to provide the desired power trains through the transmission.

The invention consists of the novel constructions, arrangements and devices to be hereinafter described and claimed for carrying out the above-stated objects and such other objects as will appear from the following description of preferred embodiments of the invention described with reference to the accompanying drawings, in which:

Fig. 3 is a diagrammatic illustration of the hydraulic transmission controls to be used with the transmission illustrated in Fig. 1 and with the electrical circuit illustrated in Fig. 2;

Fig. 4 is a view similar to Fig. 3 but of a modified hydraulic control arrangement;

Fig. 7 is a view similar to Figs. 3 and 4 but of still another modified form of the invention;

Fig. 8 is an illustration of still another modification of the hydraulic control arrangement;

Figure 10:
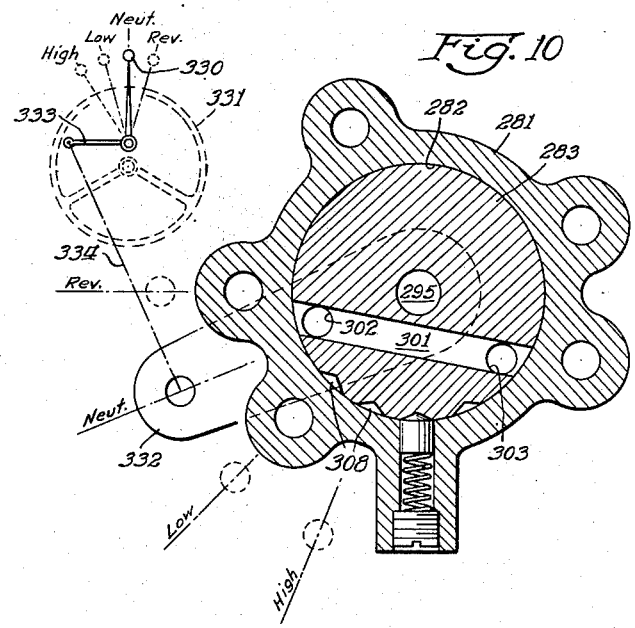
Figure 11:
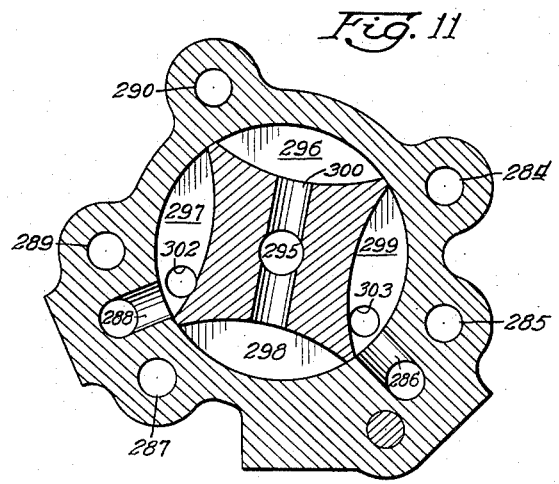

Fig. 9 is a sectional view taken on line 9—9 of Fig. 8 in the direction indicated; and Figs. 10 and 11 are sectional views taken on lines 10—10 and 11—11 in Fig. 9 in the directions indicated.

Like characters of reference designate like parts in the several views.

Figure 1:
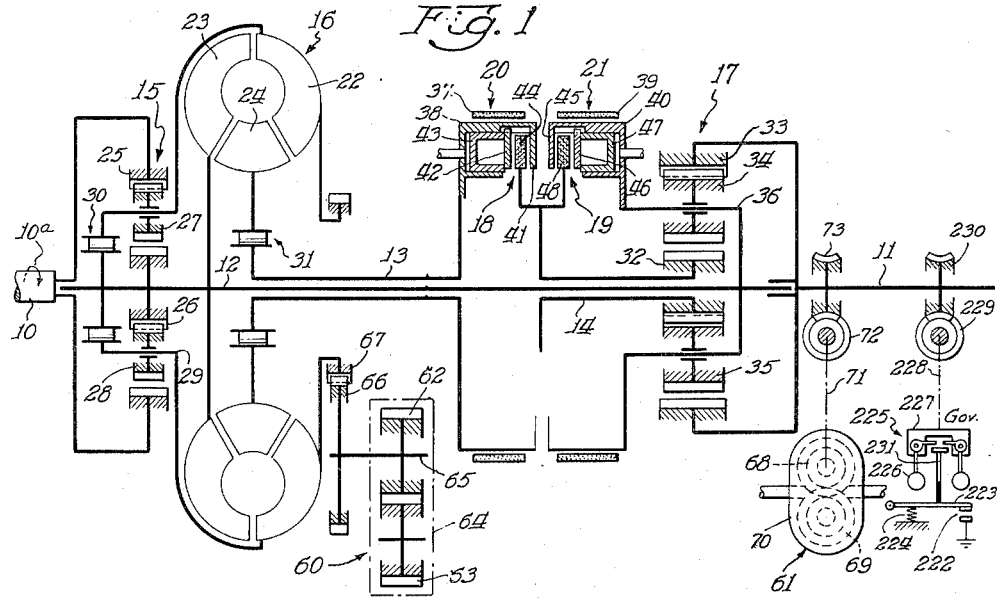
Fig. 1 is a schematic illustration of a transmission with which my improved controls may be used.

Referring now to the drawings and in particular to Fig. 1, the transmission illustrated diagrammatically therein comprises a drive shaft 10 and a driven shaft 11. The drive shaft 10 is adapted to be connected to the engine (not shown) of the automotive vehicle in which the transmission is installed, and the driven shaft 11 is adapted to be connected to the driving wheels (not shown) of the vehicle. The transmission also comprises an intermediate shaft 12 which is piloted with respect to the shafts 10 and 11 and sleeve shafts 13 and 14 which are rotatably disposed on the shaft 12. The transmission also comprises in general, a planetary gear set 15, a hydraulic torque converter 16, a second planetary gear set 17, friction clutches 18 and 19 and friction brakes 20 and 21.

The hydraulic torque converter 16 is of conventional construction and comprises a bladed impeller 22, a bladed runner 23 and a bladed stator 24. The three bladed elements 22, 23 and 24 are all disposed in the same housing which contains a body of fluid, and the converter functions to drive the runner 23 from the impeller 22 when the latter is driven. The stator functions to change the direction of flow of fluid from the runner to the impeller and causes the runner to be driven at increased torque with respect to the torque impressed on the impeller when the stator is stationary. In accordance with well-known principles, the stator tends to rotate in the same direction as the runner and impeller after certain speeds of the last two parts are reached, and after this time, the torque converter 16 functions as a simple fluid coupling in which the runner 23 is driven at the same torque as the impeller 22.

The planetary gear set 15 comprises a ring gear 25, a sun gear 26, planet gears 27 (one being shown in the drawing) in mesh with the ring gear 25, planet gears 28 (one being shown in the drawing) in mesh with the planet gears 27 and with the sun gear 26 and a planet gear carrier 29. The carrier 29 is connected with the impeller 22; the ring gear 25 is connected with the drive shaft 10; and the sun gear 26 is connected with the intermediate shaft 12. The planet gear set 15 functions to cause an initial driving of the impeller 22 at a greater rate of speed than the drive shaft 10, as when the shaft 12 is stationary. Upon the runner 23 and the shaft 12 increasing in speed, the parts of the planetary gear set 15 tend to rotate approximately at the same speed, and the impeller and runner of the torque converter 16 at this time also rotate at nearly the same speed.

A one-way clutch 30 is provided between the shaft 12 and the carrier 29. The one-way clutch is constructed to overrun or disengage when the shaft 10 is operative to drive the planetary gear set 15 and the torque converter 16 at which time the runner 23 and shaft 12 tend to rotate at a slower speed than the shaft 10. The one-way clutch 30 will engage for the opposite condition in which the shaft 12 tends to rotate in the same direction without a corresponding rotation of the drive shaft 10, as when the vehicle is being moved by towing or pushing it. A one-way brake 31 is provided for holding the stator 24 stationary, assuming that the shaft 13 is held stationary, when the reaction on the blades of the stator is in the reverse direction, that is, in the direction reverse to the direction of rotation of the impeller 22 and runner 23. The one-way brake 31 functions to release when the reaction on the stator blades reverses to allow the converter 16 to thereafter function as a fluid coupling. The direction of rotation of the shaft 10 is, incidentally, indicated by the arrow 10a, and as will be understood, the shaft 12 rotates in the same direction, as does the driven shaft 11 in forward drive.

The planetary gear set 17 comprises a sun gear 32, a ring gear 33, a plurality of planet gears 34 (one being shown in the drawing), a plurality of planet gears 35 (one being shown in the drawing), and a planet gear carrier 36. The planet gears 34 are in mesh with the ring gear 33, and the planet gears 35 are in mesh with the planet gears 34 and also with the sun gear 32. The ring gear 33 is connected with the driven shaft 11; the sun gear 32 is fixed on the shaft 14; and the carrier 36 is connected with the intermediate shaft 12.

The brake 20 comprises a brake band 37 adapted to act on a brake drum 38, and the brake is effective for braking the shaft 13 as is apparent. The brake may be actuated by a fluid pressure responsive motor as will be hereinafter described. The brake 21 comprises a brake band 39 for acting on a brake drum 40 which is connected to the carrier 36, and this brake band, like the band 37, may be actuated by a fluid pressure responsive motor. The clutch 18 comprises a pressure plate portion 41 on the drum 38, a pressure plate 42 actuated by a fluid pressure responsive piston 43 in the drum 38 and a clutch disc 44 adapted to be engaged between the pressure plate portion 41 and the pressure plate 42. The clutch disc 44 is connected with the shaft 14 so that engagement of the clutch 18 connects the shaft 14 with the drum 38. The clutch 19 comprises a pressure plate portion 45, a pressure plate 46 adapted to be actuated by a fluid pressure responsive piston 47 in the drum 40 and a friction disc 48 disposed between the pressure plate portion 45 and the pressure plate 46. The disc 48 is connected with the shaft 14, and the clutch 19 when engaged thus functions to connect the shaft 14 with the drum 40 and the planet gear carrier 36.

It is believed from the description of the transmission just given with reference to the diagrammatic illustration of it in Fig. 1, a person skilled in the art can build the transmission in operative form, and the transmission is furthermore set forth in greater detail in my copending application, Serial No. 793,261, filed December 22, 1947, issued on February 5, 1952, as Patent No. 2,584,469, which may be referred to, and further details of construction of the transmission will therefore not be described here.

The transmission provides low and direct ratios in forward drive and a drive in reverse which are completed by engagement of the various brakes and clutches in the transmission. As has been described, the shaft 12 is driven through the planetary gear set 15 and the converter 16 which together provide initially an increased torque with respect to that impressed on the drive shaft 10 and subsequently the same torque after the speeds of rotation of the shafts 10 and 12 have increased. The shaft 12 functions as the driven shaft with respect to the converter 16 and gear set 15 and as the drive shaft with respect to the planetary gear set 17, the speed ratios and drives through which are changed by engagement and disengagement of the brakes and clutches.

A low speed forward drive is completed through the transmission by engagement of the brake 20 and the clutch 18. The brake 20 functions to hold its drum 38 stationary and functions through the shaft 13 and one-way brake 31 to hold the reaction member 24 against rotation in the reverse direction, that is, in the direction opposite to the direction of rotation of the drive shaft 10. The clutch 18 when engaged functions through the shaft 14 to hold the sun gear 32 stationary to render the gear 32 the reaction element of the gear set 17, and in this connection it will be noted that the clutch 18 really functions as a brake. The shaft 12 is driven by the converter 16 and gear set 15, as has been described, and the shaft drives the planet gear carrier 36. The carrier 36 when so driven causes a low forward reduced speed drive of the ring gear 33 and thereby of the shaft 11 with respect to the shaft 12. This power train may be completed through the transmission as gradually as desired by suitable gradual engagement either of the clutch 18 or brake 20.

The direct drive power train through the transmission is completed by subsequently disengaging the clutch 18 and engaging the clutch 19. The clutch 19 when engaged functions to connect together the sun gear 32 and the planet gear carrier 36 through the drum 40 to cause these two elements of the planetary gear set to rotate together. The planetary gear set 17 is thereby locked, and the shaft 11 is driven at the same speed as the shaft 12. The brake 20 is effective when the direct drive power train is thus completed between the shafts 12 and 11 to provide a reaction point for the stator 24 to allow a conversion of torque through the torque converter 16 if the speeds of the shafts 10 and 12 are not sufficiently high so that the torque converter functions as a simple fluid coupling.

A reverse drive power train is completed through the transmission by engaging the clutch 18 and the brake 21. The brake 21 is effective on its drum 40 which is connected with the planet gear carrier 36 and the runner 23 through the shaft 12. With the runner 23 being thus held stationary, the impeller 22 rotates in the forward direction at an increased speed with respect to that of the drive shaft 10 due to the action of the planetary gear set 15, and the stator 24 has impressed on it a torque in the reverse direction and rotates in this direction. This rotation of the stator 24 causes a rotation of the sun gear 32 in the same direction, the stator being connected with the sun gear through the one-way brake unit 31, the shaft 13, the drum 38, the clutch 18, and the shaft 14. Under these conditions the one-way unit 31 is engaged to complete this drive and really functions as a clutch, as will be understood. With the planet gear carrier 36 being held stationary, this reverse rotation of the sun gear 32 causes a reverse rotation of the ring gear 33 and the shaft 11 at a reduced speed with respect to the sun gear 32 due to the action of the planet gears 34 and 35, and the reverse drive through the transmission is thus completed.

Referring now in particular to Fig. 3, the hydraulic controls for the transmission illustrated in Fig. 1 may be seen to comprise a drive shaft pump 60 and a driven shaft pump 61. Both of these pumps as illustrated are of conventional construction. The drive shaft pump comprises two pump gears 62 and 63 in mesh with each other and disposed in a pump casing 64. The gear 62 may be driven by means of a shaft 65 (see Fig. 1) and gears 66 and 67 which are in mesh. The gear 67 is fixed with respect to the impeller 22 and as is apparent, the pump 60 is thus driven in accordance with impeller speed.

The driven shaft pump 61 comprises gears 68 and 69 which are in mesh and are disposed in a pump casing 70. The gear 68 is connected by means of a shaft 71 with a gear 72 which is in mesh with a gear 73 fixed on the driven shaft 11, so that the pump 61 is driven by this shaft.

Both of the pumps 60 and 61 are connected with a fluid sump 74 which may simply constitute the oil pan for the transmission. The pump 60 is disposed in a fluid conduit 75 and the pump 61 is disposed in a fluid conduit 76 both of which have their entrance ends in the sump 74, and the pumps are so driven as to draw fluid out of the sump 74 and into the conduits 75 and 76.

Valve mechanism indicated generally at 77 is utilized for controlling engagement of the brakes 20 and 21 and the clutches 18 and 19. The pistons 43 and 47 have fluid pressure applied thereto for engaging the clutches 18 and 19, and fluid pressure operated motors 78 and 79 are provided for engaging the brakes 20 and 21 respectively.

The motors 78 and 79 comprise pistons 80 slidably disposed in cylinders 81 and connected by means of struts 82 with ends 37a and 39a of the brake bands 37 and 39 respectively. The other ends 37b and 39b of the bands are fixed so that when fluid pressure is applied to either of the pistons 80, movement of the piston is transmitted to the opposite end 37a or 39a of the respective band to engage the respective brake.

The valve mechanism 77 comprises a valve casing 83 provided with cylindrical cavities 84, 85 and 86 in which are disposed sleeves 87, 88 and 89 respectively. Valve pistons 90, 91 and 92 are slidably disposed in the sleeves 87, 88 and 89 respectively. As will hereinafter appear, the valve piston 90 is for the purpose of initially completing a power train through the transmission; the valve piston 91 is for the purpose of subsequently upshifting the transmission from its low speed ratio to its high speed ratio; and the valve piston 92 is for the purpose of conditioning the transmission mechanism either for drives in reverse or forward or in a neutral condition.

The sleeve 87 is provided with ports 93, 94 and 95, as shown. The valve piston 90 slidably disposed in the sleeve 87 is provided with lands 96, 97 and 98 and grooves 99 and 100 between the lands. In the illustrated position of the valve piston 90, the groove 100 connects the ports 94 and 95, and the groove 99 is in communication with the port 93, as shown.

The sleeve 88 has ports 101, 102, 103, 104, 105, 106 and 107 therein. The valve piston 91 has lands 108, 109 and 110 and is formed with grooves 111 and 112 between the lands. In the illustrated position of the piston 91, the groove 111 connects the ports 101 and 102, and the groove 112 connects the ports 104 and 105, as shown.

The sleeve 89 is provided with ports 113, 114, 115, 116 and 117 therein, and the valve piston 92 slidably disposed in the sleeve 89 is provided with lands 118, 119 and 120 and grooves 121 and 122 between the lands, as shown. In the illustrated position of the piston 92, the groove 121 connects the ports 113 and 114, and the groove 122 connects the ports 116 and 117.

The valve block 83 is provided with bleed channels 123 and 124 which are respectively connected with the fluid sump 74 by bleed passages 125 and 126. The channel 123 is connected with one end of the cavity 84, the ports 101 and the ports 113 so as to drain fluid from these ports and the end of the cavity 84 to the sump 74. The fluid conduit 124 is connected with the other end of the cavity 84 and with the ports 106, 107, 117 and the right end of the cavity 86, so as to drain fluid from these cavity ends and ports through the passage 126 to the sump 74. The valve block 83 is also provided with a conduit 127 which connects the ports 93 and 103 with a fluid passage 128 which is connected to both of the fluid conduits 75 and 76. Since the conduits 75 and 76 carry a supply of fluid under pressure from the pumps 60 and 61, fluid is thereby applied to the ports 103 and 93. The valve block 83 is also provided with a conduit 129 connecting the ports 94 and 104 and with a conduit 130 connecting the ports 103 and 115.

The valve piston 90 is controlled by the accelerator 131 of the vehicle in which the transmission is installed. The accelerator is connected by any suitable means, such as a rod 132, with the lever 133 for the throttle valve 134 in the carburetor 135 for the engine of the vehicle. The throttle lever 133 and the valve piston 90 are connected, and the connection may comprise a lever 136 pivoted on a pin 137 and connected by a link 138 with the throttle lever 133. A lever 139 is pivoted with respect to the valve casing 83 and has a pin 140 disposed in a slot 141 in the valve piston 90, so that rotative movement of the lever 139 will cause reciprocation of the valve piston 90. The lever 136 carries a pin 142, and this pin is disposed in a semi-circular slot 143 provided in the lever 139. The arrangement is such that when the lever 136 is rotated initially in a clockwise direction about its pin 137 corresponding to a slight depression of the accelerator 131 and corresponding slight opening of the valve 134, the pin 142 gives a movement in the counterclockwise direction to the lever 139 and thereby causes a movement of the valve piston 90 to the right as seen in Fig. 3. Further depression of the accelerator 131 causes no further movement of the valve piston 90, and the pin 142 simply travels in the semi-circular slot 143 which now is located with its center at the center of the pin 137.

The valve piston 91 is moved by means of an electric solenoid 144. The solenoid comprises an armature 145 which is connected to the piston 91, so that the piston and armature move together, and a spring 146 is provided for yieldably holding the piston 91 in its illustrated position, namely, at the limit of its movement to the left as seen in the Fig. 3. The electric solenoid 144 comprises an electric switch 147, illustrated in Fig. 3, which is opened by means of an extension 148 provided on the armature 145 that contacts the switch when the armature is in its energized position.

The valve piston 92 is adapted to be controlled by the vehicle operator by means of any suitable controls and linkage (not shown) to be connected to the piston 92. The piston 92 has three principal positions corresponding to forward drive, reverse drive and neutral conditions of the transmission, and detent mechanism is provided for holding the piston in any of these positions. The detent mechanism comprises a ball 149 slidably disposed in a cylinder 150 provided in the valve casing 83 and sleeve 89. The ball is acted on by a spring 151 which is held in position by means of a cap 152 screwed into the valve block 83 at the end of the cylinder 150. Three grooves 153 are provided in the land 120 of the piston 92 in which the ball 149 may seat. The grooves 153 are so disposed that the piston 92 is yieldably held by the ball 149 in any one of its forward, neutral and reverse positions.

The fluid pressure supply system comprising the pumps 60 and 61 and the conduits 75 and 76 includes a pressure relief valve 154 connected with the conduit 75. The pressure relief valve 154 comprises a piston 155 slidably disposed in a casing 156 and a spring 157 in the casing for acting on the piston 155. The casing 156 is provided with two ports 158 and 159. The port 158 is connected with the conduit 75 by means of a conduit 160, and the port 159 is connected to the sump 74 by means of a conduit 161.

Each of the conduits 75 and 76 includes a check valve 162. Each of the check valves comprises a ball 163 acted on by a spring 164 in such a direction as to hold the ball yieldably on a seat 165.

As has been explained, the pumps 60 and 61 are connected to the valve body 83 by means of the conduits 75 and 76 and the passage 128. The fluid pressure responsive motor 78 for the brake 20 is connected with the ports 116 by means of a conduit 166, and the motor 79 for the brake 21 is connected with the ports 114 by means of a conduit 167. The piston 43 is connected by means of a conduit 168 with the ports 105 in the sleeve 88, and the piston 47 is connected by means of a conduit 169 with the ports 102 in the same sleeve. It will be understood that the conduits 168 and 169 may extend through the transmission itself, between various shafts and sleeves and through these shafts and sleeves, as may be convenient, in order to reach the pistons 43 and 47 from the valve body 83 which is generally disposed in an actual transmission somewhere within the transmission casing.

A modulator valve 170 is disposed in the conduit 169 between the ports 102 and the piston 47. The modulator valve comprises a sleeve 171 fixed in a cylindrical cavity 172 formed in a casing 173. The sleeve 171 has bores 174 and 175 therein, and a valve piston 176 is slidably disposed in the bores 174 and 175 with piston portions 176a and 176b in the bores 174 and 175 respectively. The piston 176 has a central passage 177 therethrough, and a compression spring 178 is disposed between the piston portion 176b and the shoulder 181 forming the inner end of the bore 175. The sleeve 171 is of smaller diameter at one end so as to form a channel 182 between the sleeve and casing 173, and the sleeve is provided with a transverse passage 183 therein in communication with the conduit 182 and with the bore 174. The sleeve 171 is also provided with a longitudinal passage 184 therein in communication with the bore 175 in the sleeve 171 and with a bleed passage 185 which is in communication with the sump 74.

Figure 2:
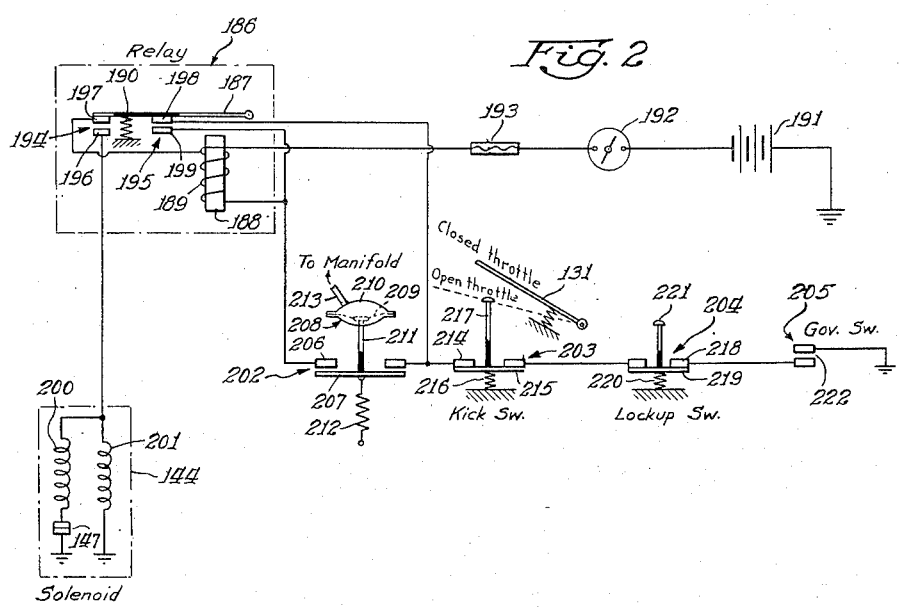
Fig. 2 is an electrical diagram which may be utilized with my transmission controls.

The solenoid 144 is controlled by the electrical system illustrated in Fig. 2. The system comprises a relay 186 having a pivoted armature 187 adapted to be attracted by magnetism in a core 188 having a winding 189 thereon. A spring 190 is provided for yieldably holding the armature in its illustrated position. One end of the winding 189 is connected to the vehicle battery 191 through the ordinary ignition switch 192 and a fuse 193. It will be understood that the ignition switch is also operative to connect the battery 191 with the vehicle engine ignition coil (not shown) in accordance with usual practice, and one terminal of the battery 191 is grounded as shown.

The relay 186 comprises two switches 194 and 195, the switch 194 comprising the contacts 196 and 197 and the switch 195 comprising the contacts 198 and 199. The contact 197 is connected with the vehicle battery 191 through the ignition switch 192 and fuse 193, and the contact 196 is connected with the solenoid 144.

The solenoid 144 comprises an energizing coil 200 and a holding coil 201. Both of these coils are connected with the contact 196, as shown, and both are grounded, the energizing coil being grounded through the switch 147.

The lower end of the relay winding 189 is connected with an engine manifold operated switch 202, an accelerator operated kickdown switch 203, a manually operated lockup switch 204 and a governor operated switch 205, and these four switches are connected in series with each other and with the winding 189 as shown. The manifold operated switch 202 comprises contacts 206 and a switch arm 207 for bridging the contacts 206 and closing the switch. One of the contacts 206 is connected with the lower end of the winding 189 and also with the relay contact 199, and the other contact 206 is connected with the switch 203 and the relay contact 198. The switch arm 207 is connected with a vacuum responsive motor 208 comprising a diaphragm 209, a casing 210 in which the diaphragm is disposed and an arm 211 fixed to the diaphragm. A spring 212 anchored at its lower end is connected to the arm 211 for holding the switch 202 opened and the diaphragm 209 in its deactuated position in which it is shown. The casing 210 is connected by means of a conduit 213 with the fuel intake manifold (not shown) of the internal combustion vehicle engine. As is well known, the vacuum in this manifold varies in accordance with the position of the accelerator of the vehicle and the effort that the vehicle engine is producing, with the vacuum increasing with a decrease in torque output of the engine and with a release of the accelerator toward engine idling position.

The kickdown switch 203 comprises contacts 214 which are bridged by an arm 215. The arm 215 is held in switch closing position by means of a spring 216, and suitable means is provided between the pedal 131 and the arm 215, such as the shaft 217, whereby when the accelerator 131 is moved to its wide open throttle position, the arm 215 is moved out of contact with the contacts 214 to open the switch 203. As will be noted, one of the contacts 214 is connected with one of the contacts 206 and with the relay contact 198. The other contact 214 is connected with the switch 204.

The lock-up switch 204 comprises contacts 218 bridged by an arm 219. A spring 220 is provided for yieldably holding the switch in closed condition, and any suitable operating means, such as a shaft 221, is provided for opening the switch 204. As will be noted, one of the contacts 218 is connected with one of the contacts 214.

The governor switch 205 comprises contacts 222, one of which is connected with a contact 218 and the other of which is grounded. Referring to Fig. 1, it will be noted that one of the contacts 222 is carried by a pivoted arm 223 which is held in switch opening position by means of a spring 224. A governor 225 is provided for closing the switch 205 at a predetermined speed of the driven shaft 11 of the transmission. The governor may be of any suitable construction and in its illustrated form comprises two weighted levers 226 pivotally mounted on a rotatable carriage 227. The carriage is mounted on a shaft 228 which is driven by the driven shaft 11 through gears 229 and 230, the gear 229 being fixed to the shaft 228 and the gear 230 being fixed to the shaft 11. The governor comprises also a longitudinally moveable shaft 231 which is acted on by one end of each of the weighted levers 226 so as to react on the arm 223 when the speed of the governor and driven shaft 11 rise above predetermined values.

The transmission controls shown in Figs. 2 and 3 operate to initially complete the low speed forward drive power train through the transmission and subsequently at the instance of the vehicle operator to upshift the transmission from its low speed ratio to its high speed ratio. The control arrangement is also conditionable for a drive in reverse.

In order to condition the transmission for a forward drive, the valve piston 92 is shifted to the left as seen in Fig. 3 from its neutral position, in which it is shown, into its "forward" position. In its forward position, the piston 92 connects the forward brake operator 78 for engaging the brake 20 with the passages 127 and 130 which carry a supply of fluid under pressure, assuming that the drive shaft 10 is being driven by the vehicle engine, the connection being by means of the groove 122 and ports 115 and 116. Under these conditions, the pump 60 is being driven, and it draws fluid from out of the sump 74 and discharges it into the conduit 75 through the check valve 162 in the conduit 75, the ball 163 of which is lifted off the seat 165 against the action of the spring 164 to allow the passage of fluid therethrough. The pressure is maintained in the conduit 75 and in the connected passages 127 and 130 at a predetermined maximum by means of the regulator 154. The conduit 160 is connected with the conduit 75, and fluid pressure is thus applied to one end of the regulator piston 155 tending to move it against the action of the spring 157 until the port 159 is uncovered to allow the escape of fluid through the conduit 161 into the sump 74. The spring 157 is so calibrated that this escape occurs at the predetermined maximum pressure desired, and the arrangement is such that the regulator maintains the fluid within the conduits 75 and 160 at this pressure. When the vehicle is being started, the driven shaft 11 and thereby the pump 61 are usually inoperative, and therefore the pump 61 is not effective to provide fluid under pressure. Under these circumstances, the escape of fluid under pressure from the pump 60 through the pump 61 is prohibited by the check valve 162 in the conduit 76, the ball of which is held on its seat 165 to close the conduit 76 by the action of both the associated spring 164 and the fluid pressure within the conduit 76 from the port 128.

Engagement of the low speed clutch 18 is controlled by a throttle opening movement of the accelerator 131 which causes movement of the valve piston 90. Throttle opening movement of the accelerator 131 causes a corresponding opening of the butterfly valve 134 in the carburetor 135 and through the link 138, the lever 136, the pin 142 and slot 143 and the lever 139 causes a movement of the valve piston 90 to the right as seen in Fig. 3.

Such movement of the valve piston brings its groove 99 into communication with the ports 94 in addition to the ports 93, and fluid flows to the low speed clutch piston 43 from the conduit 127, through the ports 93, the groove 99, the ports 94, the conduit 129, the ports 104, the groove 112, the ports 105, and the conduit 168. It is apparent that movement of the valve piston 90 is, in general, proportional to the throttle opening during the first part of the movement of the accelerator from a closed throttle position, so that the amount of fluid passing around the land 97 and through the ports 94 varies with the throttle opening. Thus the low speed clutch 18 is engaged more or less slowly depending on the initial movement of the accelerator from its closed throttle position. After the valve piston 90 has once been moved into its clutch applying position with the groove 99 opening the ports 94 completely and connecting them with the ports 93, the pin 142 with continued accelerator movement travels in the semicircular slot 143 without causing any further movement of the lever 139 and piston 90. With the clutch 18 being thus engaged more or less slowly, and with the forward brake 20 being previously engaged by a movement of the selector valve piston 92 to its forward position, the forward drive power train through the transmission is completed and the rate of completion is variable with throttle opening.

An upshift into direct drive is initiated by releasing the accelerator 131 to its closed throttle position. The accelerator has no direct connection for performing this function; however, such a release of the accelerator causes an increase in the vacuum in the engine manifold which is impressed on the diaphragm 209 in the vacuum motor 208. The vacuum motor 208 under these conditions functions to bring the switch arm 207 into contact with the contacts 206 against the action of the spring 212 to close the switch 202.

When the ignition switch 192 is first closed and the vehicle engine is started, the manifold vacuum is effective to close the switch 202; however, since the vehicle is stationary, the governor switch 205 is open, and a circuit through the winding 189 of the relay 186 is thus not complete at this time. As the driven shaft 11 increases in speed with the speed of the vehicle, the governor 225 increases in speed also and at a predetermined speed its weights 226 move outwardly to such an extent as to close the contacts 222 by movements of the arm 223 and shaft 231. The governor switch 205 is thus closed at a predetermined vehicle speed, and the switches 203 and 204 are also normally closed. Under these conditions, an upshift is initiated by releasing the accelerator as before described to close the switch 202, and a circuit is thus completed through the winding 189 from the battery 191, the circuit being through the ignition switch 192, the fuse 193, the winding 189, and the switches 202, 203, 204 and 205. The relay 186 is thus energized.

Upon such energization of the relay 186, its armature 187 moves to close the switches 194 and 195. The switch 195, as is apparent, is in parallel with the switch 202, so that subsequent throttle opening movement of the accelerator 131 opening the switch 202 does not have the effect of breaking the electric circuit through the relay winding 189, and the relay 186 remains energized as long as the governor switch 205 is closed and the vehicle remains above a predetermined speed. Closure of the switch 194 has the effect of connecting the windings 200 and 201 in the solenoid 144 with the battery 191 through the ignition switch 192 and the fuse 193 for energizing the solenoid 144. Such energization of the solenoid 144 has the effect of moving its armature 145 and thereby the valve piston 91 to the right as seen in Fig. 3 against the action of the spring 146 so that the groove 111 in the valve piston thereafter bridges the ports 102 and 103, and the groove 112 bridges the ports 105 and 106. The valve piston 91 is then in its high speed position and functions to shift the transmission to high speed ratio as will be described. This movement of the armature 145 also has the effect of opening the switch 147 to break the electric circuit through the energizing winding 200. The winding 201 is thereafter solely effective to hold the armature 145 in its actuated position against the action of the spring 146, and the winding 201 is so designed as to adequately perform this function, although, as will be understood, an additional force which is supplied by the winding 200 is needed in order to initially cause movement of the piston 91.

In its high speed position, the valve piston 91 connects the low speed clutch piston 43 with the bleed passage 126 through the conduit 168, the ports 105, the groove 112, the ports 106 and the conduit 124 for disengaging the clutch 18. The valve piston 91 functions to connect the fluid pressure supply conduit 127 with the conduit 169 for the high speed clutch 19 for engaging this clutch, the connection being through the ports 103, the groove 111, the ports 102, and the conduit 169 to the piston 47.

As will be noted, the modulator valve 170 is in the conduit 169, and the purpose of this valve is to cause a gradual application of fluid pressure to the piston 47 and thereby give a smooth engagement to the clutch 19. Initially, the flow of fluid through the modulator valve 170 is relatively rapid, as the fluid flows both through the internal bore 177 and also through the passage 183 and conduit 182. As the fluid pressure in that portion of the conduit 169 between the modulator valve 170 and the piston 47 increases, it functions to move the valve piston 176 to the left as seen in Fig. 3 against the action of the spring 178. As the piston 176 moves to the left as seen in Fig. 3, it moves across more and more of the passage 183 so as to decrease the flow of fluid through the passage 183 and thereby through the modulator valve 170 as a whole. Thus the application of fluid pressure to the clutch piston 47 is retarded after the initial rapid application of pressure to the piston 47, for softening the engagement of the clutch 19.

The transmission may be downshifted from high speed ratio to low speed ratio by moving the accelerator 131 to its open throttle position, in which position it contacts and moves the shaft 217 and switch arm 215 against the action of the spring 216 to open the switch 203. This has the effect of breaking the electric circuit through the relay winding 189 to deenergize the relay 186 so that the armature 187 moves under the action of the spring 190 back into its illustrated position in which it opens the switches 194 and 195. The solenoid 144, being connected in series with the switch 194, is thereby deenergized, and the spring 146 is effective to move the valve piston 91 back into the position in which it is illustrated in Fig. 3. In this position, the valve piston connects the conduit 169 through the ports 102, the groove 111 and the port 101 with the bleed conduit 123 for disengaging the high speed friction clutch 19. The valve piston 91 in this position connects the conduit 168 with the conduit 129 through the ports 105, the groove 112, and the ports 104, and as has been explained, the conduit 129 contains fluid under pressure when the throttle is opened in the vehicle driving range, and fluid under pressure is thus applied to the low speed clutch piston 43 to engage the clutch 18. The low speed ratio is thus completed through the transmission.

A reverse drive is completed through the transmission by moving the valve piston 92 to its reverse position. In this position the forward brake supply conduit 166 is connected with the bleed conduit 124 through the ports 116, the groove 122, and the ports 117 for maintaining this brake disengaged, and the reverse brake supply conduit 167 is connected with the fluid pressure supply conduit 130 by means of the ports 114, the groove 121 and the ports 115 for engaging this brake. The low speed clutch 18 is applied as in low speed drive by a depression of the accelerator 131 for completing the reverse drive.

The front pump 60 ordinarily functions to supply sufficient fluid under pressure to apply the various brakes and clutches for completing the drive through the transmission. However, if the vehicle engine is inoperative and it is desired to start the same by towing or pushing the vehicle, in this case the rear pump 61 will supply the necessary fluid under pressure for applying the brakes and clutches to complete a drive through the transmission. Under these conditions the check valve 162 in the conduit 75 prevents fluid under pressure from the pump 61, conduit 76 and passage 128 from passing back through the inoperative engine driven pump 60.

The purpose of the lock-up switch 204 is to permit the vehicle operator to downshift the transmission into the low speed ratio without moving the accelerator to its open throttle position. This feature is particularly advantageous in descending steep hills in which the braking effect of the engine is desired. The switch 204 when open has the same effect as the switch 203 in maintaining the relay 186 deenergized and in the condition in which it is illustrated in Fig. 2.

Figure 5:
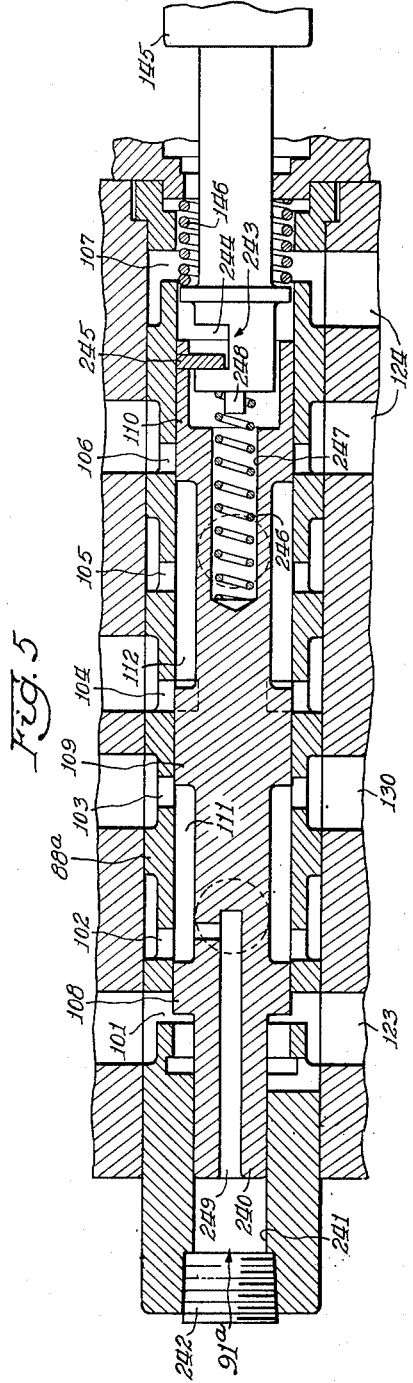
Figs. 5 and 6 are illustrations of certain valve mechanism shown in Fig. 4 but in different conditions.
Figure 6:
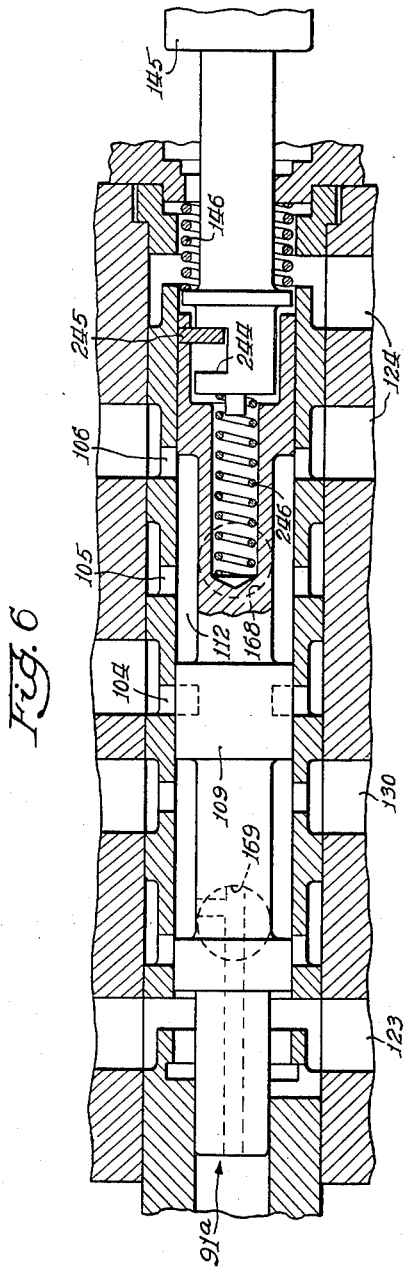

The embodiment of the hydraulic controls shown in Figs. 4, 5 and 6 is substantially the same as that shown in Fig. 3 except that the modulator valve 170 is deleted and a different type of solenoid operated valve piston 91a is utilized instead of the piston 91. The valve piston 91a is disposed in a sleeve 88a similar in some respects to the sleeve 88, and the piston 91a includes lands 108, 109 and 110 and groves 111 and 112 similar to the corresponding parts in the piston 91. The sleeve 88a includes the ports 101, 102, 103, 104, 105, 106 and 107 which are similar to the same ports in the sleeve 88 and are connected to the same fluid conduits. The valve piston 91a is also acted on by the spring 146 and is actuated by means of the solenoid 144 including the armature 145. The piston 91a differs from the piston 91 in having an extension 240 on its end opposite the solenoid 144 which fits within a reduced bore 241 provided in the sleeve 88a. The bore 241 is closed on its end by a cap 242 as shown.

The piston 91a and the armature 145 have a lost motion connection 243 between them. The connection 243 comprises a slot 244 formed in the armature 145 and a pin 245 disposed within the slot and carried by the piston 91a. The connection 243, as is apparent, allows a movement of the piston 91a without a corresponding movement of the armature 145. A spring 246 is disposed in a cylindrical cavity 247 provided in the piston 91a and extends from the inner end of the cavity 247 to the adjacent end of the armature 145 and is fixed from movement on the armature end by means of a boss 248. The spring 246 tends to move the armature 145 out of the piston 91a; however, the spring 146 is of greater effect than the spring 246 and holds the latter compressed as shown in Fig. 4 with the armature 145 telescoped in the piston 91a, unless as will be hereinafter described, the solenoid 144 is operative to compress the spring 146.

The piston 91a is provided with a fluid passage 249 which extends from its groove 111 to the adjacent end of the piston 91a within the bore 241 for purposes hereinafter to be described.

The valve piston 91a functions in a shift from low speed ratio to high speed ratio to maintain the transmission momentarily in both speed ratios at the same time. Referring to Fig. 4 in which the piston 91a is in its low speed position, it will be observed that the ports 104 connected with the fluid under pressure through the accelerator operated valve piston 90 are connected by means of the groove 112 with the ports 105 that are connected with the low speed clutch piston 43 for maintaining this clutch engaged. The ports 102 connected with the high speed clutch piston 47 are connected with the ports 101 by the groove 111 to provide a drain to the sump 74 for maintaining the high speed clutch 19 disengaged.

Upon the solenoid 144 being energized, its armature 145 is moved into the position in which it is shown in Fig. 5 causing the valve piston 91a to be moved also into the position in which it is illustrated in this figure by means of the lost motion connection 243. It will be observed that in the Fig. 5 position of the valve piston 91a, the ports 103 connected with the source of fluid pressure are connected to the ports 102 connected with the high speed clutch piston 47 by means of the groove 111 thus applying fluid pressure to the piston 47 for the clutch 19. The ports 105 connected with the piston 43 for the low speed clutch 18 are still connected with the ports 104; however, the ports 104 are partially closed. As is apparent, during the movement of the armature 145 from its Fig. 4 to its Fig. 5 position, the spring 246 has been effective to move the pin 245 to the opposite end of the slot 244 from that in which the pin was positioned for low speed drive as shown in Fig. 4. Thus, initially, upon such a movement of the armature 145, fluid under pressure is being applied to engage the high speed clutch while the low speed clutch is simultaneously maintained engaged.

The passage 249 connects the groove 111 which carries the supply of fluid under pressure to the high speed clutch piston 47 with the left end of the piston 91a as seen in the drawings, and thus substantially the same pressure that is exerted on the piston 47 is also exerted on this end of the piston 91a. This pressure is effective to tend to move the piston 91a to the right from its Fig. 5 position toward its Fig. 6 position, and as the fluid pressure on the piston 47 increases, the piston 91a does move to the right. This movement of the piston 91a tends to progressively close the ports 102 to a greater and greater extent and decreases the rate of fluid flow through the conduit 169 to the high speed clutch piston 47 and thereby to decrease the rate of engagement of the high speed clutch. This same movement of the valve 91a from its Fig. 5 toward its Fig. 6 position has the effect of closing the ports 104 by means of the land 109 and opening the bleed ports 106 to the low clutch ports 105 through the groove 112, and as the valve piston 91a moves farther and farther to the right from its Fig. 5 position toward its Fig. 6 position, the greater becomes the opening through the ports 106 and the greater the rate of disengagement of the low speed clutch becomes. Finally, as the valve piston 91a moves completely into its Fig. 6 position, the high speed clutch 19 is completely engaged and the low speed clutch 18 is completely disengaged, and the transmission is driving in high speed ratio.

As is apparent, the valve piston 91a has the same function as the modulator valve 170 in the Fig. 3 embodiment of the invention in initially providing a high rate of fluid flow to the high speed clutch piston 47 and as the engagement increases, progressively decreasing the rate of fluid flow to the high speed clutch piston. The valve piston 91a has an additional function, however, in maintaining the low speed clutch 18 engaged until a predetermined engagement of the high speed clutch is attained and, after that, causing a progressively greater rate of disengagement of the low speed clutch as the engagement of the high speed clutch progressively reaches greater values.

When the solenoid 144 is deenergized, as upon a movement of the accelerator to its open throttle kick-down position, the spring 146 is effective to move the piston 91a back into its low speed position as shown in Fig. 4 without any relative movement between the piston 91a and armature 145, and the pin 245 remains in contact with the right end of the slot 244 as seen in the figures.

The modified control system shown in Fig. 7 is quite similar to that shown in Figs. 3 and 4 with two principal points of difference. The first point of difference lies in the fact that the connections are such that the clutch 18 which is in both the low, forward and reverse power trains and may condition both of these power trains for subsequent completion has its engagement controlled by movement of the drive selecting valve 92, and the brakes 20 and 21 are subsequently controlled by movement of the accelerator 131 for completing the forward and reverse drives. The second point of difference lies in the fact that the rear pump 61 has a connection with the accelerator controlled valve 90b for keeping this valve piston in its power train completing position until the vehicle stops. The rear pump 61 as in the former control arrangements is also connected with the conduit 75 from the front pump through a check valve 162 and the conduit 76, so that the vehicle engine may be started by pushing or towing the vehicle.

The accelerator actuated valve 90b is substantially the same as the valve piston 90 with the exception that the valve piston 90b is provided with a land 260 in lieu of the land 98 and with a land 261 in sliding contact with the sides of the cavity 84. The sleeve 87b in which the piston 90b is disposed is similar to the sleeve 87 with the exception that the sleeve 87b is closed on its end as at 262, so that fluid within the ports 95 may not escape past the end of the sleeve 87b.

The valve piston 91b is similar to the piston 91a with the exception that a land 263 of shorter length is provided in lieu of the land 109 and a correspondingly longer groove 264 is provided in lieu of the groove 112. The valve sleeve 88b is substantially the same as the valve sleeve 88a with the exception that no ports 104 are provided in the sleeve. The same valve piston 92 and sleeve 89 are used in the Fig. 7 embodiment as in the embodiments of Figs. 3 and 4.

Various of the fluid connections between the valves in the Fig. 7 embodiment also differ from those in the Figs. 3 and 4 embodiments. The bleed conduit 123 is connected with the valves in the Fig. 7 embodiment in the same manner as in the Fig. 3 embodiment, and the bleed conduit 124 is also connected with the same ports in the Fig. 7 embodiment as in the Fig. 3 embodiment. The passage 127 is utilized as before for the fluid pressure supply, and both pumps 60 and 61 are connected with the passage. The rear pump 61 is also connected to a port 265 which is in communication with the space between the land 261 and the adjacent end of the sleeve 87b by means of a conduit 266. The passage 129 has a passage 267 substituted for it in the Fig. 7 embodiment which connects the ports 94 in the sleeve 87b and the ports 115 in the sleeve 89. The conduits 169 and 168 in the Fig. 7 embodiment are connected as before, respectively with the ports 102 and 105 in the sleeve 88b. The motors 78 and 79 for the forward and reverse brakes are respectively connected with the ports 116 and 114 in the sleeve 89 as in the Fig. 3 embodiment.

The valve piston 91b in its position in which it is illustrated in Fig. 7 functions to connect the fluid pressure conduit 127 with the low speed clutch conduit 168, the connection being through the ports 103, the groove 264 and the ports 105. The low speed clutch 18 thus remains engaged regardless of the position of the selector valve piston 92 when the vehicle is standing still and the solenoid 144 is thus not energized. The transmission is conditioned for a drive either in forward or reverse by moving the selector valve piston 92 to the corresponding position. When the piston 92 is moved to its forward position, it functions to connect the conduit 267 with the conduit 166 for the forward brake motor 78, the connection being through the ports 115, the groove 122 and the ports 116. As has already been described, the valve piston 90 controlled by the accelerator 131 and thereby also the valve piston 90b which is similar in this respect to the piston 90, supply a fluid pressure to the ports 94 that varies in accordance with the accelerator position. This fluid pressure is supplied to the forward brake motor 78 and functions to engage the forward brake 20 with an intensity that varies with the depression of the accelerator for gradually completing the forward drive power train through the transmission and giving a gradual and pleasing start to the vehicle.

When the vehicle has increased to a sufficiently high speed, the governor 225 is operative to close its switch 205 and upon a subsequent release of the accelerator 131, the solenoid 144 is energized as has been described, for moving the valve piston 91b to its high speed position. When so moved, the piston connects the conduit 169 leading to the high speed clutch 19 with the fluid supply passage 127, the connection being through the ports 102 and 103 and the groove 111, and the high speed clutch 19 is thus engaged. The low speed clutch piston 43 is drained to the sump 74 through the ports 105 and 106 and the groove 264 for releasing this clutch. The high speed clutch is gradually engaged and the low speed clutch is gradually disengaged upon this shift due to the fluid within the passage 249 acting to move the piston 91b, all as has been previously described in connection with the piston 91a in the Fig. 4 embodiment of the invention.

The rear pump 61 in this embodiment of the invention functions to provide a fluid pressure acting on the land 261 of the valve piston 90b through the conduit 266 for holding the piston in its position in which its groove 99 connects the ports 93 and 94 as long as there is any rotation of the driven shaft 11 with a consequent movement of the vehicle. This function of the rear pump 61 and the valve piston 90b maintains the forward brake 20 engaged, assuming that the valve piston 92 is in its forward position, as long as there is any movement of the vehicle. Thus the free wheeling action which would occur without this arrangement, in which the band 20 would be disengaged upon a release of the accelerator 131, is obviated, and the engine performs a braking action on the vehicle until the vehicle has been substantially completely stopped. A lost motion connection 138a is preferably provided in the linkage 138 for allowing the accelerator 131 to return to its closed throttle position even though the valve piston 90b is so acted on.

A drive in reverse is obtained by moving the selector valve 92 to its reverse position to connect the reverse brake conduit 167 instead of the forward brake conduit 166 with the conduit 267. In this case, the valve 90b controlled by the accelerator 131 functions to provide a controlled and gradual engagement for the reverse brake 21 instead of the forward brake 20, for gradually completing the drive in reverse and for giving a correspondingly gradual start to the vehicle in this direction.

The transmission controlling arrangement shown in Figs. 8, 9, 10 and 11 constitutes a mechanism for manually controlling the transmission of Fig. 1. Unlike the arrangements shown in Figs. 3, 4 and 7, this controlling arrangement does not utilize the electrical controls shown in Fig. 2. The controls shown in Figs. 8 to 11 includes a rotary valve 280 comprising a valve casing 281 having a cylindrical cavity 282 therein in which is disposed a rotary valve piston 283. The valve casing is provided with ports 284, 285, 286, 287, 288, 289 and 290. The rotary valve 283 is provided with a transverse opening 291 therethrough and peripheral grooves 292 and 293 which are shown in Fig. 8 in particular. The opening 291 is connected with an axial opening 295 which is connected to a source of fluid pressure, such as to both of the conduits 76 and 75 shown in Fig. 3. The rotary valve 283 has grooves 296, 297, 298 and 299 (Fig. 11) formed in its periphery and has a transverse passage 300 extending between the grooves 296 and 298 and connecting them with the central passage 295 carrying fluid under pressure. The rotary valve 283 is also formed with a transverse passage 301 connected by openings 302 and 303 respectively with the peripheral grooves 297 and 299 and by an opening 304 with the groove 292.

Poppet mechanism is provided for yieldably holding the rotary valve 283 in a plurality of different positions. This mechanism comprises a plunger 305 slidably disposed in a cylindrical cavity 306 in the casing 281. A spring 307 is provided for acting on the plunger 305, and the valve 283 is provided with a plurality of indentations 308 (Fig. 10) in which the plunger may seat.

The controlling mechanism shown in these figures comprises another valve 309 disposed in a casing 310 fixed with respect to the valve casing 281. The valve 309 comprises a sleeve 311 disposed in a cylindrical cavity 312 within the casing 310. The sleeve 311 is provided with ports 313, 314, 315, 316, 317 and 318 therein. A valve piston 319 is slidably disposed within the sleeve 311, and the piston comprises lands 320, 321 and 322 separated by grooves 323 and 324.

The ports 284 and 287 in the valve casing 281 are bleed ports for draining the fluid passing therethrough to the sump 74, and the ports 315 and 318 in the sleeve 311 are similar bleed ports. The port 285 and the port 290 are connected by conduits 325 and 326 with the low clutch piston 43, and the port 289 is connected by means of a conduit 327 with the high clutch piston 47. The port 286 in the casing 281 is connected with the ports 316 in the sleeve 311, and the port 288 is connected with the ports 313. The ports 314 in the sleeve 311 are connected by means of a conduit 328 with the motor 79 for engaging the reverse brake 21, and the ports 317 are connected by a conduit 329 with the forward brake motor 78.

The rotary valve piston 283 is controlled by means of a shift lever 330 disposed immediately beneath the steering wheel 331 of the vehicle in which the transmission is installed. The connection between the lever 330 and the rotary valve 283 comprises a lever 332 fixed with respect to the rotary valve 283, a lever 333 fixed with respect to the lever 330 and any suitable linkage 334 connecting the levers 333 and 332.

The valve piston 319 is controlled by means of the accelerator 335 for the vehicle. The accelerator is connected by the usual linkage with the carburetor of the vehicle engine (not shown), the connection comprising, for example, a bell crank lever 336 pivoted about a point 337 and connected with the accelerator by a thrust shaft 338 and with the carburetor by linkage 339. A spring 340 is provided for yieldably holding the accelerator 335 in its closed throttle position. The bell crank lever 336, on its end opposite that connected with the carburetor is connected by any suitable linkage, such as the link 341 with a lever 342 pivoted on a shaft 343 fixed with respect to the casing 281 and 310. The link 341 is connected to one arm 344 of the lever, and the valve piston 319 is connected to the other arm 345 of the lever 342 by means of a pin 346 disposed in a slot 347 in the piston 319.

A lost motion device 348 is provided in the link 341, and this may be of any suitable type and comprises a casing 349 having a spring 350 within it acting between one end of the casing and a button 351 fixed to the end of the upper portion of the link 341. A somewhat similar lost motion device 339a is provided in the linkage 339 for allowing an initial movement of the bell crank 336 with a depression of the accelerator 335 without a corresponding opening of the carburetor throttle valve (not shown).

A dash control is provided for also actuating the piston 319, and this comprises a button 352 disposed on the instrument board 353 of the vehicle and connected by means of a flexible cable 354, for example, with the lower end of the link 341 by means of a button 355 fixed to the lower end of the cable 354 and adapted to act on an abutment 356 fixed to the lower half of the link 341.

The transmission controlling arrangement shown in Figs. 8 to 11 functions to shift the transmission between its various forward speed ratios and reverse drive by means of the selector lever 330 disposed beneath the vehicle steering wheel 331. In order to shift the transmission from a neutral condition to its low speed drive condition, the lever 330 is moved to its low speed position as indicated in Fig. 10. The lever 332 and thereby the rotary valve 283 are moved correspondingly due to the connection between the levers 332 and 333. The rotary valve 283 when in its low speed position connects the central fluid pressure supply passage 295 with the port 285 by means of the transverse passage 291 through the valve, and fluid pressure is thus applied through the conduit 325 to the low speed clutch piston 43 for applying the clutch. This rotation of the rotary valve 283 also functions to bring the peripheral notch 298 into communication with the port 286, and fluid pressure is applied to this port from the central passage 295 and through the transverse passage 300. The ports 286 and 316 are connected for thus applying fluid pressure to the latter ports.

When the accelerator 335 is subsequently depressed to open the vehicle engine carburetor, the lever 336 is moved about its pivot point 337, and the lever 342 is given a corresponding movement because of the connecting linkage 341, and the valve piston 319 moves along with the lever 342. Such movement of the valve piston 319 brings its groove 324 into communication with both the ports 316 and 317, and fluid pressure is thus applied through the conduit 329 to the forward brake motor 78 for completing the low speed power train through the transmission. The valve 319 functions similar to the valve 90 in the Fig. 3 embodiment of the invention to provide a graduated engagement of the friction engaging means connected therewith, and the brake 20 is thus given a gradual engagement, according to the depression of the accelerator pedal 335. The lever 342 and the valve piston 319 connected therewith have only a limited movement in the directions just described, and the lost motion mechanism 348 allows for a subsequent depression of the accelerator 335 without any further corresponding movement of the lever 342 and valve piston 319. The lost motion device 339a allows at least a partial such engagement of the brake 20 before an opening of the carburetor throttle valve (not shown) by the linkage 339.

For a subsequent shift into high speed ratio, the control lever 330 is moved from its low speed position to its high speed position indicated in Fig. 10 causing a corresponding movement of the rotary valve 283. The valve 283 in its high speed position functions to connect its central passage 295 by means of the transverse passage 291 with the port 289. The fluid under pressure applied to this port is applied also to the engaging piston 47 for the high speed clutch 19 through the conduit 327, and the transmission is thus shifted into high speed ratio. The peripheral notch 292 in this position of the rotary valve 283 functions to connect the port 285, connected with the low speed clutch piston 43 with the bleed passage 287 for disengaging the low speed clutch. The forward brake 20 is maintained engaged as in low speed ratio.

The transmission is shifted into its reverse drive condition by moving the control lever 330 into the corresponding position which will give corresponding movements to the lever 332 and the rotary valve 283. In its reverse drive position, the rotary valve connects the port 290 by means of the passage 291 with the central passage 295 for supplying fluid under pressure to the low speed clutch engaging piston for engaging the clutch 18. Fluid under pressure is applied also to the motor 79 for the reverse brake 21 by means of the peripheral notch 298 which connects the passages 295 and 300 with the port 288. The port 288 is connected with the ports 313 in the valve 309, and actual engagement of the reverse brake 21 is delayed until the accelerator is moved in a throttle opening direction so as to give a corresponding movement to the valve piston 319. In this case, the groove 323 in the piston 319 connects the ports 313 and 314 so as to apply fluid pressure to the conduit 328 connected with the reverse brake motor 79, and as will be understood, similar to the brake engagement for forward drive, the engagement of the brake 21 for reverse drive may be made gradually for giving a gradual start to the vehicle.

The purpose of the passage 301 and its openings 302, 303 and 304 is to provide for bleeding the brake motors 78 and 79 when the transmission is in a condition in which these brakes are not required to be engaged, as will be apparent. When the transmission is operating in either low or high speed forward drive the forward brake 20 is engaged and fluid is bled from the reverse brake pump 79, through the conduit 328, ports 314, groove 323, ports 313, port 288, peripheral groove 297, opening 302, passage 301, opening 304, peripheral groove 292 and through the bleed port 287 to the sump 74. When the transmission is operating in high speed forward drive the high speed clutch 19 is engaged and fluid is bled from the low speed clutch 18 through the conduit 325, port 285, peripheral groove 292 and through the bleed port 287 to the sump 74. During the period when the transmission is operating in low speed forward drive the low speed clutch 18 is engaged and fluid is bled from the high speed clutch 19 through the conduit 327, port 289, peripheral groove 292 and through the bleed port 287 to the sump 74. During reverse drive the reverse brake 21 is engaged and fluid is bled from the forward brake pump 78, through the conduit 329, ports 317, groove 324, ports 316, port 286, peripheral groove 299, opening 303, passage 301, opening 304, peripheral groove 292 and through the bleed port 287 to the sump 74. The high speed clutch is bled during reverse drive over the same path as that traced for the bleeding thereof during low forward drive.

The poppet mechanism, including the plunger 305, as will be understood, functions to yieldably hold the rotary valve 283 in any of its principal positions, corresponding to neutral, low and high speed forward drives and to reverse drive.

The purpose of the control knob 352 located on the instrument board 353 is to provide an arrangement whereby the lever 342 and the valve piston 319 may be moved into their positions for engaging the forward and reverse brakes without the corresponding depression of the accelerator 335 required without such an arrangement. The transmission may thus be maintained in driving condition regardless of a release of the accelerator 335 to a closed throttle position.

My improved hydraulic transmission controls as they are illustrated in Figs. 3 to 7 advantageously include three valves, one under the control of the accelerator for providing a gradual engagement of a starting friction engaging device for the vehicle, a solenoid valve for providing a shift in speed ratio from low speed drive to high speed drive and vice versa under the control of the accelerator for the vehicle, and a third valve which is a selector valve for conditioning the transmission for forward or reverse drive. The improved arrangement shown in Fig. 9 combines the selector valve and solenoid valve into the rotary valve 283 whch is manually controlled and includes an accelerator controlled valve for giving the gradual engagement of a starting friction device. The hydraulic control arrangement in Fig. 3 advantageously includes a modulator valve for the high speed clutch 19 that provides a gradual engagement of this clutch by allowing an initially relatively great fluid flow to the clutch and a subsequent decreased fluid flow which is controlled by the pressure on the clutch. The modulator valve shown in Figs. 4, 5 and 6 not only controls the engagement of the high speed clutch 19 in this manner but also controls the disengagement of the low speed clutch 18 so as to give a very smooth shift between these two clutches. The modification of the invention shown in Fig. 7 advantageously incorporates an arrangement for preventing the free-wheeling of the vehicle which includes the rear pump 61 connected with the accelerator controlled valve for holding this valve in its power train completing position until the vehicle stops. The rotary valve arrangement shown in Figs. 8, 9, 10 and 11 is advantageously simple in construction.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission controls for an automotive vehicle transmission, the combination of a drive shaft, a driven shaft, means for providing a low speed forward drive power train through the transmission and including first and second fluid pressure operated engaging means completing the power train when engaged, means for providing a high speed power train through the transmission and including a third fluid pressure operated engaging means and said second engaging means which when engaged complete the power train, means for providing a reverse drive power train through the transmission and including a fourth fluid pressure operated engaging means and said first engaging means which when both are engaged complete the power train, an accelerator for the vehicle, a selector valve for selectively completing a fluid conduit to said second or fourth engaging means for conditioning the transmission for a forward or reverse drive, a valve under the control of said accelerator for selectively completing fluid conduits for causing engagement of said first or third engaging means on movements of said accelerator to predetermined positions and a third valve under the control of said accelerator for completing a fluid conduit to one of the said engaging means for both forward and reverse drives for causing an engagement thereof which is graduated according to vehicle throttle opening for providing a gradual start for the vehicle.

2. In transmission controls for an automotive vehicle, the combination of a drive shaft, a driven shaft, means for providing a low speed forward drive power train between said shafts and including a first fluid pressure operated friction brake and a first fluid pressure operated friction clutch for completing the power train when engaged, means for providing a high speed forward drive power train between said shafts and including a second fluid pressure operated friction clutch and said first friction brake for completing the power train when engaged, means for providing a reverse drive power train between said shafts and including a second fluid pressure operated friction brake and said first friction clutch for completing the power train when engaged, an accelerator for the vehicle, a selector valve for selectively completing a fluid conduit to either of said friction brakes, a valve under the control of said accelerator for selectively completing fluid conduits for causing engagement of said first or second friction clutches when the accelerator is moved between predetermined positions for shifting the transmission between low and high speed forward drives, and a second valve under the control of said accelerator for completing a fluid conduit to one of said friction power train completing means for both the forward and reverse drive power trains for causing an engagement thereof which is graduated according to vehicle throttle opening for gradually completing both of the power trains and for giving a gradual start to the vehicle.

3. In transmission controls for an automotive vehicle, the combination of a drive shaft, a driven shaft, means for providing a low speed forward drive power train between said shafts and including a first fluid pressure operated friction brake and a first fluid pressure operated friction clutch for completing the power train when engaged, means for providing a high speed forward drive power train between said shafts and including a second fluid pressure operated friction clutch and said first friction brake for completing the power train when engaged, means for providing a reverse drive power train between said shafts and including a second fluid pressure operated friction brake and said first friction clutch for completing the power train when engaged, an accelerator for the vehicle, a selector valve for selectively completing fluid conduits for causing engagement of said brakes, a valve under the control of said accelerator for selectively completing fluid conduits for causing engagement of said clutches for shifting the transmission between its low and high forward drives and a second valve under the control of said accelerator for completing a fluid conduit to said first clutch for causing an engagement thereof which is graduated according to vehicle throttle opening for providing a gradual completion of the low forward or reverse drives.

4. In transmission controls for an automotive vehicle, the combination of a drive shaft, a driven shaft, means for providing a low speed forward drive power train between said shafts and including a first fluid pressure operated friction brake and a first fluid pressure operated friction clutch for completing the power train when engaged, means for providing a high speed forward drive power train between said shafts and including a second fluid pressure operated friction clutch and said first friction brake for completing the power train when engaged, means for providing a reverse drive power train between said shafts and including a second fluid pressure operated friction brake and said first friction clutch for completing the power train when engaged, an accelerator for the vehicle, a selector valve for selectively completing fluid conduits for causing engagement of said brakes, a valve under the control of said accelerator for selectively completing fluid conduits for causing engagement of said second clutch when the accelerator is moved to a closed throttle position and for causing engagement of said first clutch when the accelerator is returned to an open throttle position, and a second valve under the control of said accelerator for completing a fluid conduit to said first clutch for causing an engagement thereof which is graduated according to vehicle throttle opening for gradually completing either the low speed forward or reverse power trains.

5. In transmission controls for an automotive vehicle transmission, the combination of a drive shaft, a driven shaft, means for providing a low speed forward drive power train through the transmission and including a first fluid pressure operated friction clutch and a first fluid pressure operated friction brake completing the power train when engaged, means for providing a high speed forward drive power train through the transmission and including a second fluid pressure operated friction clutch and said first brake which when engaged complete the power train, means for providing a reverse drive power train through the transmission and including a second fluid pressure operated friction brake and said first friction clutch which when both are engaged complete the power train, an accelerator for the vehicle, a selector valve for selectively completing fluid conduits for conditioning either of said brakes for engagement, a valve under the control of said accelerator for selectively completing fluid conduits for causing engagement of said friction clutches in different predetermined positions of the accelerator, and a second valve connected with said selector valve and under the control of said accelerator for completing a fluid conduit to thereby apply a fluid pressure to the brake selected by said selector valve which is graduated according to vehicle throttle opening for causing a gradual completion of either said reverse or said low forward power trains.

6. In transmission controls for an automotive vehicle transmission, the combination of a drive shaft, a driven shaft, means for providing a low speed forward drive power train through the transmission and including a first fluid pressure operated friction brake and a first fluid pressure operated friction clutch for completing the train when engaged, means for providing a high speed forward drive power train through the transmission and including said first brake and a second fluid pressure operated friction clutch for completing the power train when engaged, means for providing a reverse drive power train through the transmission and including a second fluid pressure operated friction brake and said first friction clutch for completing the power train when engaged, an accelerator for the vehicle, a selector valve for selectively completing a fluid pressure connection with either of said brakes, a valve under the control of said accelerator for completing fluid pressure connections for causing engagement of said second clutch when the accelerator is moved to a closed throttle position and for causing an engagement of said first clutch on a return of the accelerator to an open throttle position for shifting between low and high speeds forward drive, and a second valve under the control of said accelerator and connected in series with said selector valve and said brakes for completing a fluid pressure connection for causing an engagement of the brake selected by the selector valve which is graduated according to vehicle throttle opening for providing a gradual engagement of the brake.

7. In transmission controls for an automotive vehicle, the combination of a drive shaft, a driven shaft, means for providing a low speed forward drive power train between said shafts and including a first fluid pressure operated engaging means and a second fluid pressure operated engaging means for completing the power train when engaged, means for providing a high speed forward drive power train between said shafts and including a third fluid pressure operated engaging means and said second engaging means for completing the power train when engaged, means for providing a reverse drive power train between said shafts and including a fourth fluid pressure operated engaging means and said first engaging means for completing the power train when engaged, an accelerator for the vehicle, valve means for completing fluid pressure connections to thereby apply fluid pressure to said engaging means for engaging them for each of said power trains, and a valve under the control of said accelerator for completing a fluid pressure connection to an engaging means for each of said low speed forward and said reverse power trains for causing an engagement thereof which is graduated according to vehicle throttle opening for providing a smooth completion of each of the power trains.

8. In transmission controls for an automotive vehicle, the combination of a drive shaft, a driven shaft, means for providing a low speed forward drive power train between said shafts and including a first fluid pressure operated friction clutch and a first fluid pressure operated friction brake for completing the power train when engaged, means for providing a high speed forward drive power train between said shafts and including a second fluid pressure operated friction clutch and said first friction brake for completing the power train when engaged, means for providing a reverse drive power train between said shafts and including a second fluid pressure operated friction brake and said first friction clutch for completing the power train when engaged, an accelerator for the vehicle, valve means for completing fluid conduits to thereby apply fluid pressure to the respective friction clutches and brakes for each of said power trains, and a valve under the control of said accelerator for completing a fluid conduit to one of said friction clutches or brakes for each of said low speed forward and reverse power trains for causing an engagement thereof which is graduated according to vehicle throttle opening for providing a gradual completion of the respective power train.

9. In transmission mechanism, the combination of a drive shaft, a driven shaft, means for providing a low speed power train between said shafts and including a fluid pressure operated engaging means for completing the power train, means for providing a high speed power train between said shafts and including a second fluid pressure operated engaging means for completing the power train, means for supplying a fluid pressure to said engaging means, said supply means including a valve having two principal positions in one of which it supplies fluid pressure to one of said engaging means and in the other of which it supplies fluid pressure to the other engaging means and between its said two positions it supplies fluid pressure to both of said engaging means, and means for applying the fluid pressure supplied to one of said engaging means on a face of said valve for shifting it from a position intermediate its said two principal positions into one of said two principal positions in response to the pressure exerted on the valve face.

10. In transmssion mechanism, the combination of a drive shaft, a driven shaft, means for providing a low speed power train between said shafts and including a fluid pressure operated friction engaging means for completing the power train, means for providing a high speed power train between said shafts and including a fluid pressure operated friction engaging means for completing the power train, a source of fluid pressure, means including a valve for connecting said pressure source with said friction engaging means, said valve having two principal positions in one of which it connects said fluid source with one of said friction engaging means and in the other of which it connects said fluid source with the other friction engaging means and between its two positions it connects said fluid source with both of said friction engaging means and restricts the fluid flow from the fluid source to either engaging means, an operating member connected with said valve for moving it from one of its said principal positions into a position between its said two principal positions, and means for applying the fluid pressure supplied to one of said engaging means to a face of said valve for moving the valve the remainder of the distance to its other said principal position.

11. In transmission mechanism, the combination of a drive shaft, a driven shaft, means for providing a low speed power train between said shafts and including a fluid pressure operated friction engaging means for completing the power train, means providing a high speed power train between said shafts and including a fluid pressure operated friction engaging means for completing the power train, a source of fluid pressure, and means for connecting said fluid pressure source and said friction engaging means and including a valve having a low speed ratio position and a high speed ratio position, said valve in its high speed ratio position connecting said high speed friction engaging means with said fluid source with a restricted passage and in its low speed ratio position connecting said low speed friction engaging means with said fluid source and when moving from a position intermediate its said two positions progressively restricting said passage to said high speed engaging means, an operating member for moving said valve from its low speed ratio position to its said intermediate position, and means for applying on a face of said valve the fluid pressure applied to said high speed friction engaging means for moving said valve from its said intermediate position into its high speed ratio position, and spring means for opposing such movement of the valve whereby the fluid flow to said high speed ratio friction engaging means is relatively great at first and is restricted upon the increase in fluid pressure applied to the high speed ratio friction engaging means.

12. In transmission mechanism, the combination of a drive shaft, a driven shaft, means for providing a low speed power train between said shafts and including a fluid pressure operated friction engaging means for completing the power train, means for providing a high speed ratio power train between said shafts and including a fluid pressure operated friction engaging means for completing the power train, a source of fluid pressure, means for connecting said fluid pressure source and said friction engaging means and comprising a valve having two principal positions in one of which it connects said low speed friction engaging means and said fluid pressure source and in the other of which it connects said high speed friction engaging means and said fluid pressure source, said valve between its said two principal positions connecting both of said friction engaging means with said pressure source and when moving from said intermediate position to its high speed position restricting the conduit to said high speed ratio friction engaging means, an operating member connected with said valve by means of a lost motion connection whereby the operating member is effective to move said valve from said low speed position to said intermediate position, and means for connecting said high speed friction engaging means and a face of said valve whereby the fluid pressure effective on said high speed friction engaging means is effective on said face to move said valve from its said intermediate position to its high speed position and thereby gradually decreasing the fluid flow to said high speed friction engaging means, and spring means effective on said valve for resisting the effect of the fluid applied to said high speed ratio engaging means on said valve tending to move the valve from its said intermediate position to its high speed ratio position.

13. In transmission mechanism, the combination of a drive shaft, a driven shaft, means for providing a low speed power train between said shafts and including a fluid pressure operated friction clutch for completing the power train, means for providing a high speed power train between said shafts and including a second fluid pressure operated friction clutch for completing the power train, a source of fluid pressure, means for connecting said fluid pressure source and said friction engaging means and for providing a conduit between the source and the engaging means and including a valve, said valve having a low speed position in which it connects said low speed friction clutch with said fluid pressure source and having a high speed position in which it connects said high speed clutch and said fluid pressure source with a restricted passage and having an intermediate position in which it connects said high clutch and said fluid pressure source with a passage of greater area and connects said low speed clutch and said fluid pressure source with a restricted passage, an operating member for moving said valve and having a lost motion connection with the valve whereby the operating member may be utilized to move the valve from its low speed position to its said intermediate position, a spring effective on said operating member for yieldably holding the operating member in its low speed position, said valve being formed with a passage for connecting said high speed friction clutch in the said intermediate position of said valve with an end of the valve whereby the fluid pressure applied to the high speed friction clutch is effective to move the valve from its said intermediate position to its said high speed position, a spring between said operating member and said valve yieldably holding said valve in its said intermediate position and against movement therefrom to its said high speed position, and a motor for moving said actuating member.

14. In a transmission for an automotive vehicle, the combination of a drive shaft, a driven shaft, an accelerator for the vehicle, means for providing a power train between said shafts, means under the control of said accelerator for completing said power train when the accelerator is moved from a closed throttle toward an open throttle position and for breaking the power train when the accelerator is released to move in the opposite direction, and means responsive to the speed of said driven shaft for modifying the action of said second-named means and maintaining the power train completed above a predetermined speed of the driven shaft when the accelerator is released to return to a closed throttle position, said last-named means including a fluid supply source providing a fluid pressure varying directly as the speed of the driven shaft, said fluid pressure being impressed on said second named means for holding the same in power train completing condition according to the speed of the driven shaft.

15. In a transmission for an automotive vehicle, the combination of a drive shaft, a driven shaft, an accelerator for the vehicle, means for providing a power train between said shafts, means under the control of said accelerator for completing said power train when the accelerator is moved from a closed throttle toward an open throttle position and for breaking the power train when the accelerator is released to move in the opposite direction, said last-named means including a control member which is moved in accordance with the accelerator and has a power train completing and a power train breaking position, and means responsive to the speed of said driven shaft for modifying the action of said second-named means and maintaining the power train completed above a predetermined speed of the driven shaft when the accelerator is released to return to a closed throttle position, said last-named means including a pump driven by said driven shaft for supplying fluid under pressure, said fluid supplied by said pump being impressed on said control member for holding the control member in a power train completing position according to the operation of said pump.

16. In a transmission for an automotive vehicle, the combination of a drive shaft, a driven shaft, an accelerator for the vehicle, means for providing a power train between said shafts and including a fluid pressure operated friction engaging means for completing the power train, a source of fluid pressure, a valve controlled by said accelerator for connecting said fluid pressure source and said engaging means for completing said power train when the accelerator is moved from a closed throttle toward an open throttle position and for moving the valve in the opposite direction and breaking the power train when the accelerator is released to move in the opposite direction, and means responsive to the speed of said driven shaft for modifying the action of said accelerator for holding the valve in its power train completing position above a predetermined speed of the driven shaft when the accelerator is released to return to a closed throttle position and including a pump driven by said driven shaft and having its output connected to be impressed on said valve.

17. In a transmission for an automotive vehicle, the combination of a drive shaft, a driven shaft, an accelerator for the vehicle, means for providing a power train between said shafts and including a friction engaging means, a fluid pressure operated motor for engaging said engaging means, a source of fluid pressure, a valve for connecting said fluid pressure source and said motor for engaging said engaging means and being under the control of said accelerator for completing the power train when the accelerator is moved from a closed throttle toward an open throttle position and for returning the valve for breaking the power train when the accelerator is released to move in the opposite direction, a pump driven by said driven shaft for supplying fluid under pressure to said valve for holding the valve in its power train completing position as long as the driven shaft is rotating even though the accelerator is released to return to a closed throttle position, said connection between said accelerator and said valve including a lost motion connection which allows the accelerator to return to its closed throttle position when said valve is held in its power train completing position by the action of said pump.

18. In a transmission, the combination of a drive shaft, a driven shaft, means for providing a low forward drive speed ratio between said shafts and including a fluid pressure engaged brake and a fluid pressure engaged clutch for completing the power train, means for providing a high speed forward drive power train between said shafts and including said brake and a second fluid pressure operated clutch for completing the power train, means for providing a reverse drive power train between said shafts and including said first clutch and a second fluid pressure engaged brake for completing the power train when engaged, a source of fluid pressure, and a rotary valve having a position corresponding to each of said power trains and in each of its positions connecting the respective clutches and brakes with said pressure source.

19. In a transmission, the combination of a drive shaft, a driven shaft, means for providing a low speed forward drive power train between said shafts and including a fluid pressure engaged clutch and a fluid pressure engaged brake for completing the power train when engaged, means for providing a high speed forward drive power train between said shafts and including a second fluid pressure engaged clutch and said first fluid pressure engaged brake which complete the power train when engaged, means for providing a reverse drive power train between said shafts and including a second fluid pressure engaged brake and said first fluid pressure engaged clutch for completing the power train when engaged, a source of fluid pressure, a rotary valve comprising a first section and a second section, said first section having ports connected with said clutches and said second section having ports connected with said brakes and adapted to connect said fluid pressure source and said clutches and brakes, said rotary valve having a position corresponding to each of said ratios and connecting the respective clutches and brakes with said fluid pressure source in its respective positions.

20. In a transmission for an automotive vehicle, the combination of a drive shaft, a driven shaft, means for providing two different power trains between said shafts and including a fluid pressure operated engaging means for completing each of the power trains, a source of fluid pressure, a rotary selector valve movable into a position corresponding to each of said power trains and in each of its positions connecting the respective engaging means with said pressure source, an accelerator for the vehicle, and a valve under the control of said accelerator and in series with said rotary valve and with only one of said engaging means regardless of said selector valve position, said accelerator controlled valve being adapted and arranged to complete gradually a fluid pressure connection to said last-mentioned engaging means as the accelerator is moved from a closed throttle position toward an open throttle position for initially completing a power train through the transmission.

21. In a transmission for an automotive vehicle, the combination of a drive shaft, a driven shaft, an accelerator for the vehicle, means for providing a low speed forward drive power train through the transmission and including a first fluid pressure operated friction brake and a first fluid pressure operated friction clutch which when engaged complete the power train, means for providing a high speed forward drive power train through the transmission and including said first fluid pressure operated friction brake and a second friction clutch which when both are engaged complete the power train, means for providing a reverse drive power train through the transmission and including a second fluid pressure operated friction brake and said first friction clutch which when both are engaged complete the power train, a source of fluid pressure, a rotary selector valve adapted to connect said pressure source and said friction clutches and brakes and having a position corresponding to each of said power trains and in each of its said positions connecting the respective clutches and brakes with said pressure source, and a valve in series with said rotary valve and said brakes and controlled by the accelerator for opening a conduit to said friction brakes from said rotary valve when the accelerator is moved from a closed throttle toward an open throttle position whereby the engagement of the friction brakes is governed in accordance with the position of the accelerator.

22. In transmission mechanism, the combination of a drive shaft, a driven shaft, means for providing a power train between said shafts and including a fluid pressure operated friction engaging means for completing the power train, and means for supplying a fluid pressure to said engaging means for engaging it, said fluid supplying means including means forming a fluid supply conduit to said engaging means and a modulating valve in said conduit for initially allowing a relatively high rate of fluid flow to said engaging means and subsequently decreasing the rate of fluid flow, said valve including a movable valve piston responsive to the fluid pressure impressed on said friction engaging means, means defining a passage in said valve adapted to be blocked to a greater and greater extent by said piston as it is moved under the influence of increasing fluid pressure impressed on said friction engaging means, and spring means for yieldably holding said movable piston in its passage opening position and acting against the force applied on said piston by the fluid pressure as applied to said friction engaging means, said piston being provided with a restricted passage therethrough providing a continuous fluid pressure connection to said engaging means independent of the movement of the piston.

References Cited in the file of this patent
UNITED STATES PATENTS

| | | |
|---|---|---|
| 583,581 | Randerson et al. | June 1, 1897 |
| 1,609,782 | Small et al. | Dec. 7, 1926 |
| 2,006,753 | Thomas | July 2, 1935 |
| 2,193,305 | Thompsen | Mar. 12, 1940 |
| 2,229,345 | Schotz | Jan. 21, 1941 |
| 2,314,554 | Pennington | Mar. 23, 1943 |
| 2,329,724 | Maurer | Sept. 21, 1943 |
| 2,332,593 | Nutt et al. | Oct. 26, 1943 |
| 2,333,681 | Schneider | Nov. 9, 1943 |
| 2,348,435 | Hey et al. | May 9, 1944 |
| 2,370,859 | Hale | Mar. 6, 1945 |
| 2,372,817 | Dodge | April 3, 1945 |
| 2,374,303 | Osborne | April 24, 1945 |
| 2,378,085 | Jandasek | June 12, 1945 |
| 2,381,786 | Tyler | Aug. 7, 1945 |
| 2,397,634 | Voytech | April 2, 1946 |
| 2,404,623 | Dodge | July 23, 1946 |
| 2,407,289 | La Brie | Sept. 10, 1946 |
| 2,418,378 | Voytech | April 1, 1947 |
| 2,466,206 | Carnagua | April 5, 1949 |
| 2,516,203 | Greenlee | July 25, 1950 |
| 2,516,208 | Hasbany | July 25, 1950 |
| 2,584,469 | Kelbel | Feb. 5, 1952 |
| 2,604,197 | Livermore | July 22, 1952 |
| 2,627,189 | McFarland | Feb. 3, 1953 |
| 2,633,035 | Livermore | Mar. 31, 1953 |

FOREIGN PATENTS

| | | |
|---|---|---|
| 530,421 | Great Britain | Dec. 11, 1940 |